H. H. Smith.
Mower.
No. 2402 Reissued Nov. 27. 1866.
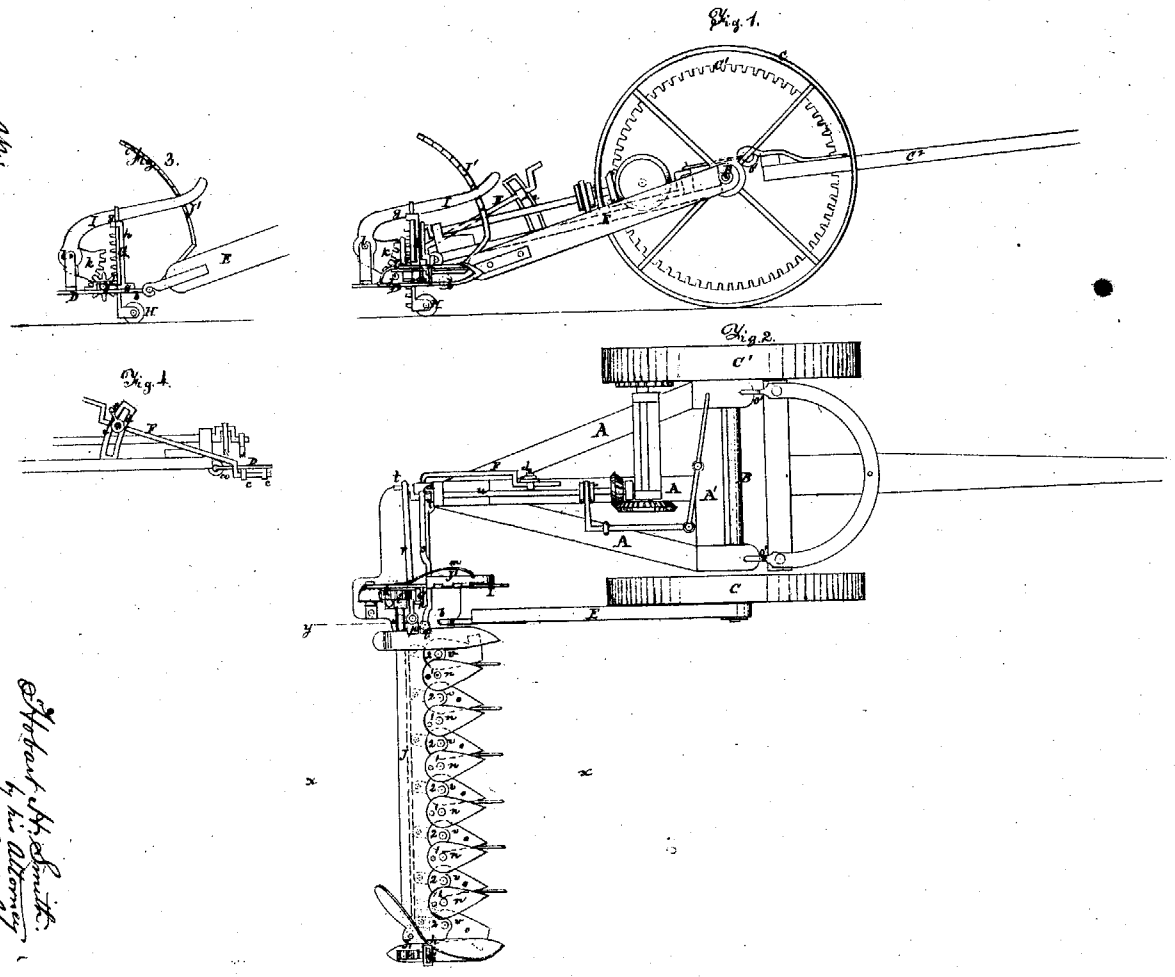
Witnesses
R. Leech
N. B. Smith
Hobart H. Smith.
by his Attorney
A. M. Smith

United States Patent Office.

IMPROVEMENT IN HARVESTERS.

HOBART H. SMITH, OF CARLISLE, PENNSYLVANIA, ASSIGNEE BY MENSE ASSIGNMENTS OF C. M. LUFKIN.

DIV. D.

*Letters Patent No.* 18,173, *dated September* 8, 1857; *reissue No.* 2,402, *dated November* 27, 1866.

SPECIFICATION.

TO ALL WHOM IT MAY CONCERN:

Be it known that C. M. LUFKIN, of Acworth, in the county of Sullivan, and State of New Hampshire, invented certain new and useful improvements in Harvesting Machines; and I do hereby declare the following to be a full, clear, and exact description of the same, reference being had to the accompanying drawing, and to the figures and letters of reference marked thereon, making part of the same, and in which—

Figure 1 is a transverse section of a harvesting machine embracing said improvements, taken in the line *x x*, fig. 2.

Figure 2 is a plan or top view of the same.

Figure 3 is transverse section of the finger-bar, taken in the line *y y*, showing the means for raising and lowering the cutting apparatus; and Figure 4 is a detached view of the means for elevating and depressing the points of the cutters.

Similar letters of reference indicate corresponding parts in the several figures.

The improvement embraced in this application consists, first, in the employment, in a side-draught machine, of a curved slot and set-screw, in combination with a vibrating frame or its equivalent, which adapts a laterally projecting hinged cutting apparatus to conform to the surface of the ground over which it is drawn, independently of the vertical movements or vibrations of the main axle of the machine, for the purpose of setting the cutters at any desired angle of presentation to the ground; second, in the employment of a curved standard upon said vibrating frame; third, in the combination of an adjusting lever with a curved standard or way on which said lever is adjusted; and fourth, in the combination of a curved standard, an adjusting lever, and a means for setting and holding said lever for the purposes hereinafter specified.

To enable others skilled in the art to construct and use said improvements, I will proceed, with reference to the drawing, to describe how the same may be carried out in practice.

In said drawings, A represents a frame, which is connected at one end to the main axle in such manner as to be free to vibrate thereon as a centre. C C′ are the wheels mounted on the axle B, and D is the finger-bar connected, by means of a hinge at its inner or heel end, to the rear end of frame A; said hinge being shown, in this instance, as consisting of a hook, *a*, secured to the end of the frame, passing loosely through an eye formed in the end of the bar in such manner as to be allowed to swing freely thereon to adapt it to conform to the surface of the ground over which it is drawn, and also to allow the angle of the cutting apparatus relative to the frame and the angle of presentation of the cutters to the ground to be changed to adapt them to the work to be performed, or to the varying height at which the vibrating end of the frame may be set. A rod or lever, F, is attached to the end of bar D, near the hinge or hook, *a*; said lever being attached by passing loosely through lugs or eyes, *e c*, on the under side of said bar. The lever or rod, F, has a screw fitted in it, and the said screw passing through a curved slot or guide-way in a curved guide standard, *e*, on the frame, and being provided with a thumb-nut, the lever may be held at any desired height in relation to the said slot by the tightening of the nut against the curved slotted standard. Said standard, together with the slot formed therein, is made in the arc of a circle, of which the hinge (on which the cutting apparatus is turned when the angle of presentation thereof is changed) is the centre; and the lever vibrating about the same centre, the devices for holding or setting the same consequently remain always in proper working relation to the standard, and may be quickly and easily operated without removing any of the parts while the machine is in motion.

From the foregoing it will be seen that through the hinge connection of the laterally projecting cutting apparatus with the frame, and the connection of the frame with the axle in such manner as to vibrate freely thereon, each end of the cutting apparatus is allowed to conform to the surface of the ground independently of the other end, and independently of the vertical movements or vibrations of the main axle; and, further, that by raising or lowering the free end of lever F, the angle of presentation of the cutters to the ground, or of relation to the vibrating frame may be varied to suit the nature of the work to be performed, the character of the ground over which the cutting apparatus is drawn, or the height from the ground at which the vibrating end of the frame may be set. If the ground is rough and stony, the points of the cutters require to be elevated so that the under surfaces of the cutters and fingers, as the machine is drawn forward, will strike the obstructions and readily slide over them. If, however, the ground is smooth, the fingers and cutters may be set in a horizontal position; or, if the grass or grain be fallen, the points of the fingers and cutters may be so depressed as to pick up and cut the fallen portions. The machine is drawn forward by means of the tongue, which is hinged to the frame; and a hinged draw-bar, E, is shown for properly sustaining the cutters in a working position. The height of the cutting apparatus from the ground is regulated by means of a lever, I, operating through a rock-shaft, upon adjustable racks and wheels, H. These parts, however, being described in other applications of even date herewith, do not require further description here.

What is claimed under this patent, as the invention of C. M. LUFKIN, is—

1. The employment in a side-draught machine of a curved slot and set-screw, in combination with a vibrating frame, or its equivalent, which adapts a laterally projecting hinged cutting apparatus to conform to the surface of the ground over which it is drawn independently of the vertical movements or vibrations of the main axle of the machine, for the purpose specified.

2. The employment of a curved adjusting way or standard located on the vibrating frame, or its equivalent, for the purpose specified.

3. The combination of an adjusting lever with a curved standard or way on which said lever is adjusted or held, for the purpose specified.

4. The combination of a curved way or standard, an adjusting lever, and a means for setting or holding said lever, for the purposes specified.

In testimony whereof I have hereunto set my hand this 22d day of October, 1866.

HOBART H. SMITH.

Witnesses:

J. F. GOUCHER,

S. D. HOUSTON.